L. P. BASSET.
PROCESS FOR THE MANUFACTURE OF IRON AND STEEL DIRECTLY FROM THE ORE, AND IMPROVED APPARATUS THEREFOR.
APPLICATION FILED OCT. 24, 1918.

1,360,711.

Patented Nov. 30, 1920.
3 SHEETS—SHEET 1.

Inventor.
L. P. Basset
By H. R. Kerslake
Atty

L. P. BASSET.
PROCESS FOR THE MANUFACTURE OF IRON AND STEEL DIRECTLY FROM THE ORE, AND IMPROVED APPARATUS THEREFOR.
APPLICATION FILED OCT. 24, 1918.
1,360,711.
Patented Nov. 30, 1920.
3 SHEETS—SHEET 2.
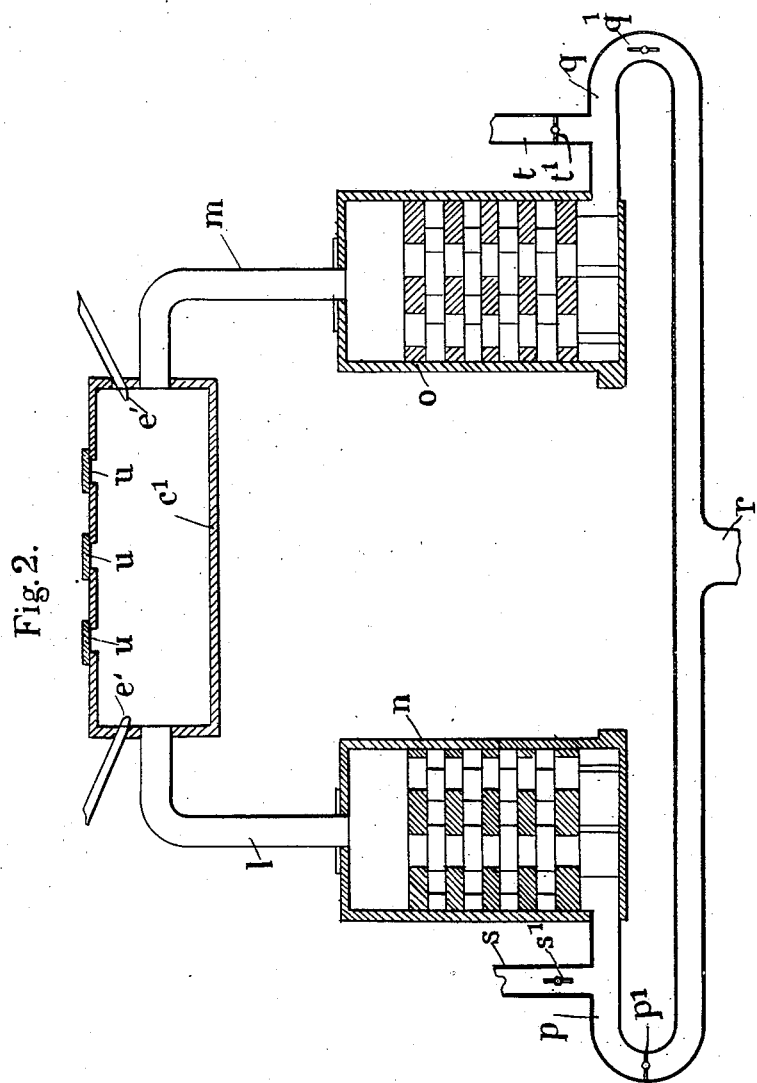

UNITED STATES PATENT OFFICE.

LUCIEN PAUL BASSET, OF PARIS, FRANCE.

PROCESS FOR THE MANUFACTURE OF IRON AND STEEL DIRECTLY FROM THE ORE, AND IMPROVED APPARATUS THEREFOR.

1,360,711.     Specification of Letters Patent.     Patented Nov. 30, 1920.

Application filed October 24, 1918. Serial No. 259,558.

*To all whom it may concern:*

Be it known that I, LUCIEN PAUL BASSET, of 92 Rue de la Victoire, Paris, France, chemist, have invented Improved Processes for the Manufacture of Iron and Steel Directly from the Ore, and Improved Apparatus Therefor, of which the following is a full, clear, and exact description.

Various processes have already been proposed for effecting the direct production of wrought iron from the ore, but none of those processes has been able to hold its own, as regards economy, against the processes for the decarburization of cast iron by means of air.

Such proposed processes belong to two distinctive classes:

1. One class in which the reduction of the ore is effected by means of an excess of carbon burned by the action of a current of air injected through a twyer. As the temperature of the furnace is not sufficient to melt the wrought iron the latter collects in the form of a "bloom". The wrought iron produced in this manner contains slag which lowers the quality of the metal. If by means of a special apparatus the temperature of the furnace were to be raised to a degree such as to effect the melting of the wrought iron, the latter would become carburized by the excess of carbon, and would thus be converted into cast iron. The furnaces that carry out that process can therefore yield wrought iron only in the condition of a "bloom" (such furnaces are the Catalan furnace, and bloomery furnaces of all types.) That process has further the drawback of consuming a great deal of ore and carbon, because owing to the action of the injected air a portion of the produced wrought iron is burned at the same time as the carbon. Under these conditions a state of equilibrium is established between the carbon, the iron, the oxygen of the air, and the slag, with the result that the latter becomes very rich in iron oxid, so that there is a great loss of ore.

2. A second class in which the ore is reduced at a low temperature either by means of carbon in externally heated retorts, or by means of carbon monoxid passed through an externally heated mass of iron oxid.

In both cases spongy masses of metallic iron are produced. The wrought iron thus produced cannot be used in that state. It has to be melted in order to give it the necessary cohesion as well as to separate it from the slag if an absolutely pure ore has not been used.

This melting of the "sponges" is one of the great drawbacks of that process, because in this highly subdivided or porous condition, a considerable proportion of the iron is burned in the melting operation, whereby it is re-converted into iron oxid. That process is very wasteful and has been completely abandoned at the present time.

The present invention has for its object to provide an improved process for the production of ingot iron and steel without any risk of the metal being carburized or re-oxidized.

The improved process consists essentially:—

1, in first reducing the ore by means of only the exact quantity of carbon that is necessary for that purpose; and 2, in melting the resulting spongy iron in an extremely hot flame producing only carbon monoxid at a temperature higher than the melting point of iron.

This hot flame may be produced by the combustion, in pre-heated air, of finely divided carbon, preferably in the form of flour. This carbon is injected into the furnace by means of hot air, in such proportion as to insure that its combustion will generate practically only carbon monoxid.

The carbon monoxid flame thus produced may reach a very high temperature varying according to the temperature of the air blown in. This high temperature easily effects the fusion of the iron. Since the nature of carbon monoxid does not allow of the metal becoming carburized or oxidized at all, the drawbacks of the known process are thereby obviated.

The richness of the flame in carbon or oxygen can be easily varied. For instance, when the iron is melted, it may be desirable to inject a slight excess of carbon in order to carburize the metal and convert it into steel, or to add a slight excess of oxygen for the purpose of eliminating from the iron bath any secondary elements, such as silicon, manganese, phosphorus, carbon, etc., where such elements have been introduced therein during the primary reaction. In such a case this oxidizing stage after the reducing fusion constitutes a simple refining operation.

Acid fusion or basic fusion is to be employed according to the nature of the ore to be treated, and the material of the furnace will be suitable to this chemical condition.

The carbon monoxid used in the improved process may be produced by the combustion of any carbonaceous substances; such as coal, crude petroleum, etc.

Where crude petroleum is used, it may be injected easily by means of a sprayer. The combustion of this petroleum takes place in a regulated amount of hot air, and the proportion of injected petroleum is so regulated and adjusted that the carbon will burn to carbon monoxid, while the hydrogen which is present in the hydrocarbon molecule will remain free as hydrogen, because its combustion would generate water vapor which would oxidize the iron.

The accompanying drawings illustrate by way of example some constructions of apparatus for carrying the improved process into effect.

Figs. 2, 3 and 4 illustrate other constructions.

Figure 1:
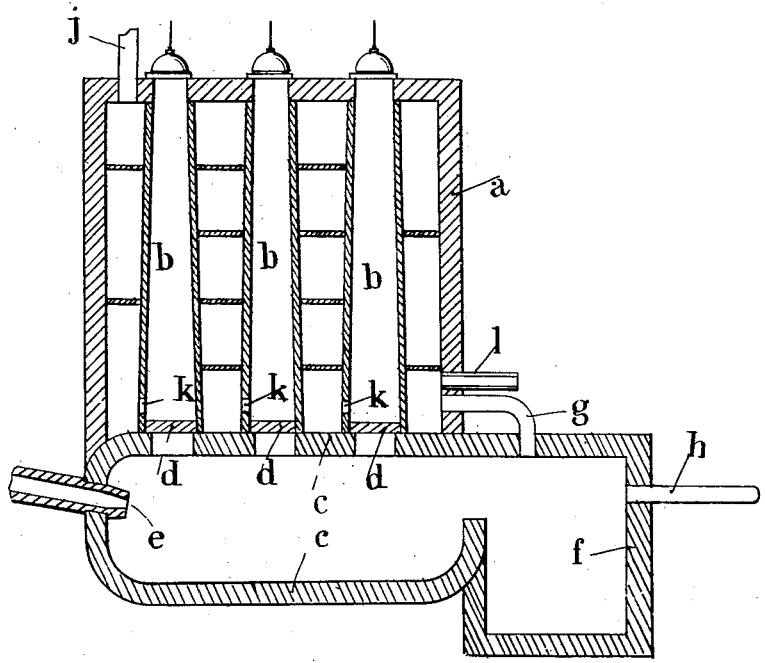
Figure 1 is a vertical section of one construction of these apparatus.

The construction of apparatus illustrated in Fig. 1 comprises a brickwork chamber $a$ containing vertical retorts $b$ charged with the iron ore to be treated which is mixed with just the sufficient quantity of carbon that is necessary to reduce this ore. This brickwork chamber $a$ is situated over a reverberatory furnace $c$ provided to each retort $b$ with an aperture that is closed by a trap door $d$ or other closing device which, when opened, will allow the spongy iron contained in the retort to drop on to the hearth of the furnace $c$.

The reverberatory furnace $c$ has, opening into it one or more twyers $e$ through which air and "flour" carbon are introduced into the said furnace. The air is preheated in any suitable apparatus, for instance in an apparatus of the Whitwell, Cooper or other type. The carbon is supplied regularly by a screw conveyer working at an adjustable speed so that the supply of carbon may be adjusted to the requisite proportion for producing carbon monoxid.

At the end of the reverberatory furnace $c$ there is arranged a dust chamber $f$ which receives the solid particles that are carried over, and the ashes resulting from the fuel. Two conduits $g$, $h$ lead from this chamber $f$. The conduit $g$ opens into the interior of the brickwork chamber $a$ and delivers into the latter an adjustable fraction of the carbon monoxid generated in the reverberatory furnace $c$ by the combustion of the carbon that has been injected into the latter. There also opens into the chamber $a$, close to the conduit $g$, a pipe $i$ through which air enters in the requisite proportion for the combustion of the carbon monoxid supplied by the conduit $g$. The products of combustion pass between the retorts $b$ to which they give up their heat, and escape through the uptake $j$.

The gas that escapes through the conduit $h$ is led to devices (not shown in the drawings) for heating the air that is injected through the twyer $e$.

The improved apparatus operates as follows:—

The retorts $b$ are charged with fine ore or crushed ore with which the proportion of fuel is mixed that is required to effect the reduction of the ore (about 320 kgs. per ton of iron to be produced if the ore is sesquioxid of iron $Fe_2O_3$), and the requisite fluxes.

The hearth of the furnace $c$ is charged with wood which is kindled. Then the air and the fine carbon are injected through the twyer $e$, the carbon becoming rapidly ignited. When the furnace is hot, the proportion of the injected air and carbon is adjusted so as to generate carbon monoxid. Then the gas is ignited which is led by the conduits $g$ and $h$ into the chamber $a$ of the retorts $b$ and into the air-superheaters.

When the reduction of the ore in the retorts $b$ is finished, the trap doors $d$ are opened and the spongy iron produced in those retorts, drops on to the hearth of the reverberatory furnace $c$ where it is subjected to the intense heat of the said furnace. This spongy iron melts without any possibility of becoming oxidized because the flame has no action whatever on the iron. The slag is therefore separated out by fusion, and being lighter it floats on top of the molten metal. The retorts $b$ are recharged immediately after their discharge, for the purpose of furnishing fresh quantities of spongy iron.

When the fusion on the hearth of the reverberatory furnace $c$ is finished, the slag is run off through a suitable slag opening (not shown), and the metal is treated either with additions, such as carbon, manganese, etc., or with an oxidizing flame, with slight reduction of the carbon. The refining is then effected by known methods.

The carbon monoxid generated in the retorts $b$ by the reduction of the ore escapes through orifices $k$ provided at the bases of the retorts inside the chamber $a$ where it burns and yields a portion of the heat required for the reducing operation.

The hereinbefore described furnace is shown with vertical retorts, but the latter may equally well be inclined or horizontal.

Since a reverberatory furnace can melt a large quantity of metal it will require to feed it a large number of retorts, which cannot always be placed on the limited surface of the reverberatory furnace. In such a case the retort chamber $a$ is made quite independent of the reverberatory furnace $c$, and the retorts $b$ are arranged to discharge either into a chamber or vessel wherein the discharged spongy iron is cooled before being admitted to the reverberatory furnace, or into channels that convey the spongy iron directly (without allowing the iron to cool very much) into the reverberatory furnace.

Fig. 2 illustrates a furnace wherein the reduction and the fusion are effected on the same hearth. This apparatus comprises a reverberatory furnace $c^1$ connected at front and back by flues $l$, $m$, that are well protected from loss of heat by radiation, to heat regenerators $n$, $o$, filled with refractory checkerwork.

Twyers $e$ $e^1$ deliver into the two ends of the furnace for injecting alternately into the latter, exclusively carbon which is supplied by a screw conveyer running at an adjustable speed, and is carried along by a weak current of, preferably hot, air.

The gases of combustion coming from the furnace $c^1$ and issuing from the heat regenerators $n$, $o$, are received by conduits $p$, $q$, that deliver into a common conduit $r$ and are alternately opened and closed by means of dampers $p^1$, $q^1$. Into these conduits $p$, $q$, there open, close to the heat regenerators, air supply conduits $s$, $t$, which are connected with fans and are alternately opened and closed by means of dampers $s^1$, $t^1$.

The operation of this apparatus is as follows:—

The dampers $p^1$ and $t^1$ being closed, and the dampers $s^1$ and $q^1$ being opened, the air delivered by the conduit $s$ passes through the heat regenerator $n$ into the furnace $c^1$. A wood fire is kindled on the hearth of this furnace and then finely subdivided carbon is injected through the twyer $e$ in the requisite proportion to generate carbon monoxid. The latter ignites rapidly and the temperature of the furnace rises. The gases of combustion pass through the heat regenerator $o$ to which they give up their heat, and they pass out through the conduit $q$ and the conduit $r$.

After about one hour, when the brickwork in the regenerator $o$ has begun to get red hot, the flow of the gases is reversed by closing dampers $s^1$, $q^1$, and opening dampers $t^1$, $p^1$. The finely subdivided carbon is then injected through the twyer $e^1$. The combustion of this carbon in the furnace $c^1$ becomes more intense because it is effected by means of hot air. The regenerator $n$ is then being heated while the regenerator $o$ is being cooled.

In this manner the direction of the flow of the gases is reversed alternately at the expiration of a determined period, in such a manner as to reduce the variations in the temperature of the air supply as desired.

When the furnace $c^1$ has been heated to the desired temperature there is introduced upon the hearth of this furnace, either through the doorway or through the charging holes $u$ the iron ore in a coarsely or finely crushed state mixed with the requisite fluxes and the quantity of carbon that is just sufficient to reduce the iron oxid to metallic iron.

Under the action of the heat the iron oxid is reduced by the carbon so as to yield metallic iron and carbon monoxid without the possibility of any inverse action taking place because the flame which is composed exclusively of carbon monoxid and nitrogen, has no effect upon the produced iron.

Under the action of the high temperature of the furnace the slag forms and melts, and then the iron melts also in its turn. The slag is separated out and the iron is refined if necessary, or receives an admixture of the elements required to produce ordinary steels or special steels. Finally the metal is run off and the furnace is recharged.

The gases generated in the furnace consist of carbon monoxid and nitrogen and have a high fuel value.

As hereinbefore stated, the furnace may be acid or basic according to the nature of the ore to be treated.

The carbon monoxid issuing from the conduit $r$ may be employed for heating a retort furnace similar to the furnace $a$ shown in Fig. 1. The spongy iron produced in this retort furnace may, in such a case, be simply melted in the reverberatory furnace $c^1$ shown in Fig. 2. Owing to this fact the consumption of carbon in the furnace $c^1$ is diminished considerably because the reduction of the ore has been previously effected in the retort furnace by the carbon monoxid derived from this furnace $c^1$.

Figure 3:
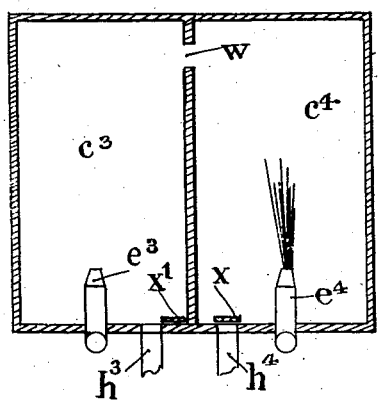

The improved process may likewise be carried into effect by means of an apparatus comprising, as shown in Fig. 3, two furnaces $c^3$, $c^4$ situated side by side, communicating with each other at one end through an aperture $w$ and each provided at their other end with a twyer $e^3$, $e^4$ through which the finely divided carbon can be injected as hereinbefore stated, and also with a conduit $h^3$, $h^4$ for the escape of the gases of combustion, and further with dampers $x$ $x^1$ that allow of opening and closing alternately, the exit conduits $h^3$, $h^4$, and thereby reversing the direction of the flow of the gases, while alternating the injection of the finely divided carbon, so as to produce a systematic circulation of the gases.

Figure 4:
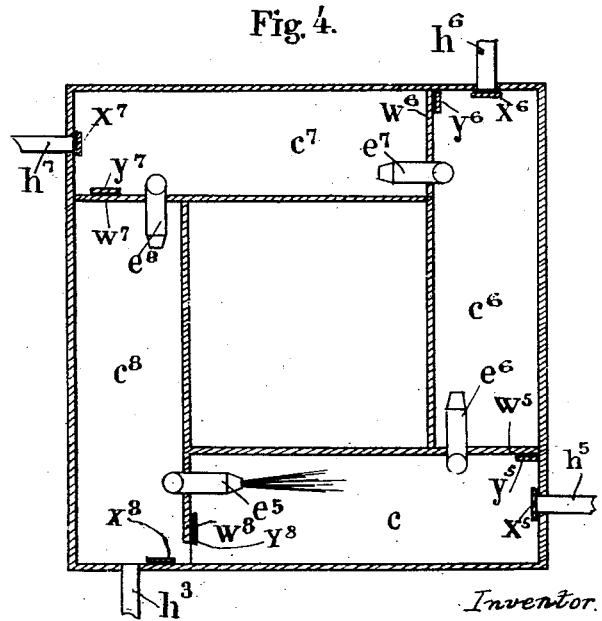

Fig. 4 illustrates another modification comprising four furnaces $c^5$, $c^6$, $c^7$, $c^8$, communicating with one another in succession through apertures $w^5$, $w^6$, $w^7$, $w^8$, and each provided with twyers $e^5$, $e^6$, $e^7$, $e^8$, and with a conduit $h^5$, $h^6$, $h^7$, $h^8$, for the escape of the gases of combustion. By the operation of suitably situated dampers $x^5$, $x^6$, $x^7$, $x^8$, and $y^5$, $y^6$, $y^7$, $y^8$, the gases can be caused to pass systematically from one furnace to another, the finely divided carbon being injected successively through the twyers $e^5$, $e^6$, $e^7$, $e^8$ and the ore mixed with carbon being charged upon the hearth from which the molten metal has just been run off.

The spongy iron may also be produced in a rotary furnace heated with carbon monoxid derived from the melting furnace, and this spongy iron may be introduced into the latter with exclusion of air. The hearth of the melting furnace would then be fed with finely divided carbon and hot air in the desired proportions so as to obtain only carbon monoxid as hereinbefore stated.

A further modification of the improved process consists in effecting the reduction of the ore by means of carbon monoxid by causing the latter to pass through the mass of ore, which is contained in externally heated retorts as in the apparatus shown in Fig. 1, or is treated in any other suitable furnace.

Figure 5:
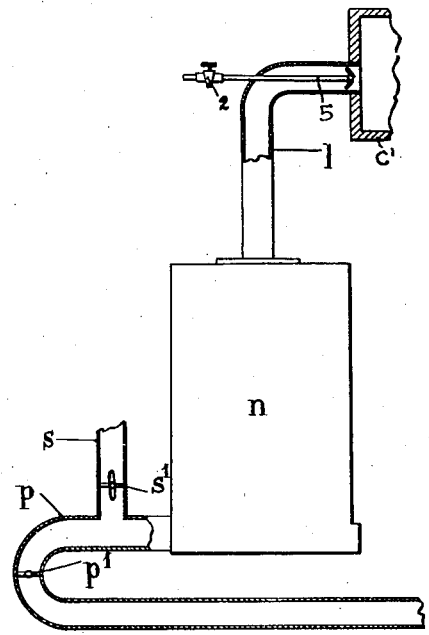
Fig. 5 shows a preferred means for introducing the petroleum flame into the furnace.

In Fig. 5 is shown a preferred form of device for introducing the petroleum into the furnace. In this device, the oil enters through the atomizers, regulated by valve 2. The dampers $s'$ and $p'$ being in the position shown in this figure and in Fig. 2, and a regulated amount of air entering by the pipe $s$, being heated in the recuperator $n$. The hot air from the recuperator $n$ passes up through pipe 1 into the furnace $c'$. The damper $s'$ is opened enough to let in sufficient air to burn the carbon of the petroleum hydrocarbons to the condition of C O, and to leave the hydrogen unconsumed, so that C O and H enter the furnace $c'$. At the high temperature existing in the furnace, no team can exist in the gaseous atmosphere.

The use of petroleum in place of powdered coal or other like fuel, has the advantage (where petroleum can be purchased at a low price) of being more easy to regulate.

It is to be understood that the hereinbefore described apparatus is given solely by way of example, and that the shapes, dimensions and constructional details of the constituent parts of the said apparatus may be modified without departing thereby from the spirit of the present invention.

Claims.

1. A process for the manufacture of iron and steel directly from the ore, which consists substantially in reducing the ore by means of a carbonaceous reducing agent, and in melting the produced metal by means of a very hot flame producing substantially only carbon monoxid, to the substantial exclusion of carbon dioxid and water vapor.

2. A process as claimed in claim 1, wherein the carbon monoxid flame for melting the iron is produced by the combustion of finely divided carbon injected by the, preferably heated, air for combustion, the carbon and air being so proportioned as to produce carbon monoxid with the substantial exclusion of the formation of carbon dioxid.

3. A process as claimed in claim 1, wherein the ore is first reduced by means of the theoretical quantity of reducing agent in externally heated retorts in such a manner as to produce the iron in the spongy state, and in melting the produced spongy iron in a reverberatory furnace in a very hot flame, produced substantially carbon monoxid.

4. A process as claimed in claim 1, wherein the reduction and the melting of the metal are effected in succession on the hearth of the same reverberatory furnace heated in both cases by means of a carbon monoxid flame.

5. A process as claimed in claim 1, wherein the reduction of the ore is effected by passing carbon monoxid through the mass of the ore; said carbon monoxid being produced during the melting of the spongy iron, while the same is wholly separate from the ore being reduced.

6. A process for the direct manufacture of iron and its carbureted compounds, starting with the ore, consisting substantially; in reducing the ore by carbon in an atmosphere of carbon monoxid, and in melting the metal thus obtained by means of a hot flame composed of carbon monoxid and containing neither carbon dioxid nor water vapor in substantial amounts.

7. A process for the direct manufacture of iron and its carburized compounds, starting with the ore, consisting substantially; in reducing the ore by carbon in an atmosphere of carbon monoxid, and in melting the metal thus obtained by means of a very hot flame composed of carbon monoxid and containing neither carbonic acid nor water vapor in substantial amounts, said flame being obtained by the combustion of a finely subdivided fuel in the quantity of superheated air necessary for the production of only carbon monoxid.

8. A process for the direct manufacture of iron and its carburized compounds, starting with the ore, consisting substantially; in reducing the ore by the carbon in an atmosphere of carbon monoxid, and in melting the metal thus obtained by means of a furnace heated by a very hot flame composed of carbon monoxid and of hydrogen and containing neither carbonic acid nor water vapor in appreciable amounts.

9. A process for the direct manufacture of iron and its carburized compounds, starting with the ore, consisting substantially; in reducing the ore by the carbon in an atmosphere of carbon monoxid, and in separately melting the metal thus obtained by means of a very hot flame composed exclusively of carbon monoxid and of hydrogen and containing neither carbonic acid nor water vapor, said flame being obtained by the combustion of an atomized liquid fuel in the quantity of superheated air necessary to produce by combustion practically only carbon monoxid and hydrogen.

10. An apparatus for reducing iron ore to sponge and for melting the latter, comprising a retort furnace in which the ore is reduced; a reverberatory furnace in which the spongy iron produced in the said retort furnace is melted; a twyer for injecting into the said reverberatory furnace air and finely divided carbon in the requisite proportions for generating exclusively carbon monoxid; and a conduit for delivering into the retort furnace a portion of the carbon monoxid generated in the reverberatory furnace.

11. An apparatus for reducing iron ore to iron sponge and for melting the latter, comprising a reverberatory furnace provided at its two ends with twyers for injecting carbon alternately, and communicating at its two ends with two heat regenerators; and dampers for reversing the direction of the flow of the gaseous current for the purpose of regulating at will the variations of temperature of the air supply.

12. An apparatus for reducing iron ore to iron sponge and for melting the latter, comprising two juxtaposed furnaces communicating with each other at one end, each provided at their other end with a twyer for injecting the finely divided carbon, and with a conduit for the exit of the gases of combustion; and suitably situated dampers for alternately opening and closing the exit conduits; the injection of the finely divided carbon into the two furnaces being likewise alternate for the purpose of producing a systematic flow of the gases.

13. An apparatus for reducing iron ore to iron sponge and for melting the latter, comprising a plurality of furnaces communicating successively with one another, each provided with a twyer and a conduit for the exit of the gases of combustion; and suitably situated registers for passing the gases systematically from one furnace to another; the injection of the finely divided carbon being effected successively into the several furnaces; and the ore mixed with carbon being charged upon the hearth from which the molten metal has been run off.

The foregoing specification of my improved process for the maufacture of iron and steel directly from the ore, and improved apparatus therefor, signed by me this 17th day of September 1918.

LUCIEN PAUL BASSET.

Witnesses:
 JOHN F. SIMONS,
 FRANÇOIS WEBER.